Aug. 14, 1962 A. D. OWEN ET AL 3,049,705
POSITION-SELECTIVE CALL AND IDENTIFICATION SYSTEM
Filed April 1, 1960
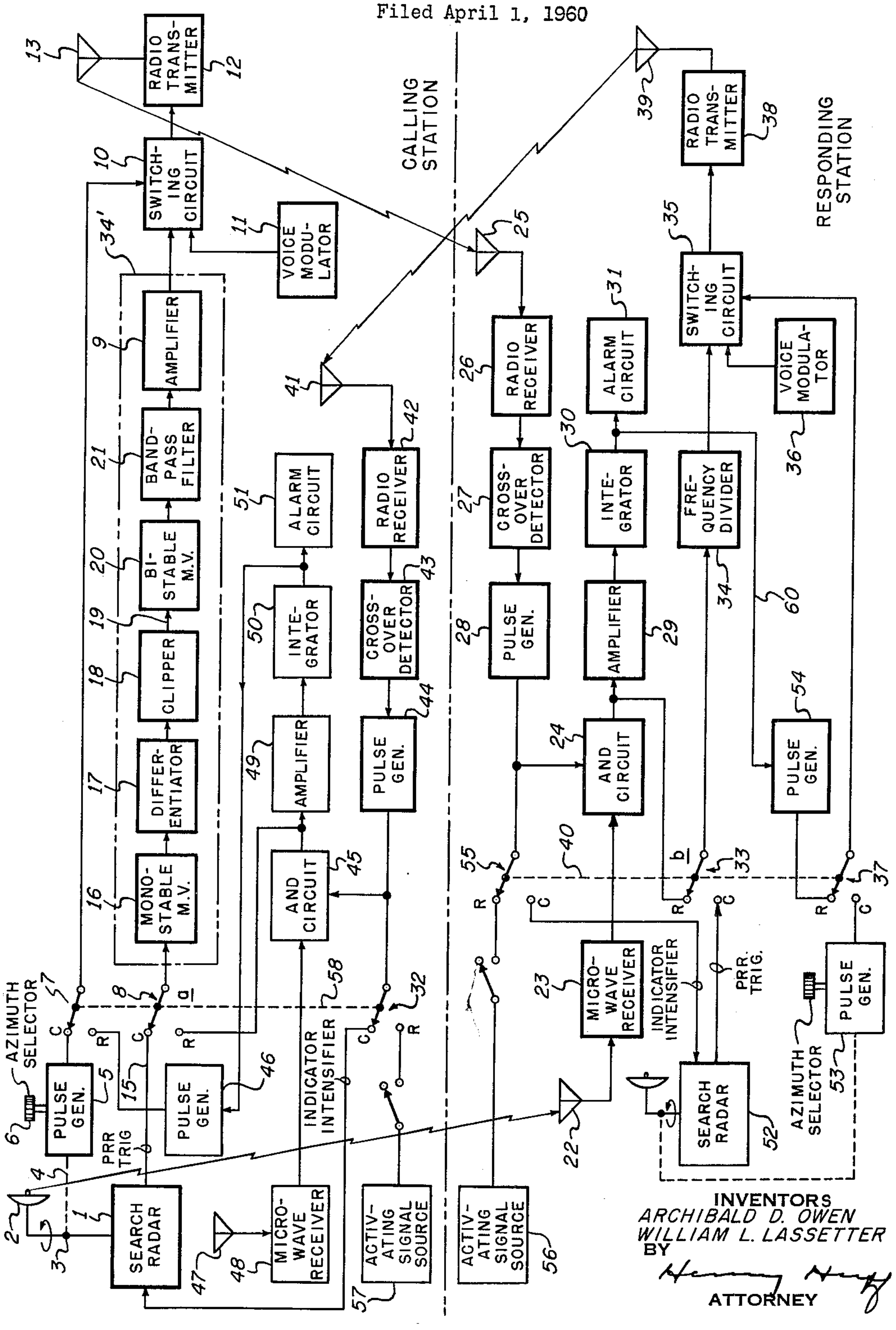
INVENTORS
ARCHIBALD D. OWEN
WILLIAM L. LASSETTER
BY
ATTORNEY United States Patent Office 3,049,705
Patented Aug. 14, 1962

3,049,705

POSITION-SELECTIVE CALL AND IDENTIFICATION SYSTEM

Archibald D. Owen and William L. Lassetter, Charlottesville, Va., assignors to Sperry Rand Corporation, Great Neck, N.Y., a corporation of Delaware Filed Apr. 1, 1960, Ser. No. 19,235
8 Claims. (Cl. 343—6)

The present invention relates to selective communication systems and, more particularly, to such a system adapted for operation with conventional search radar and radio communication apparatus.

Radio aids to navigation are playing an ever increasing role in the coordination of vehicular traffic. In the coordination and control of harbor traffic, for example, relatively wide-spread use is presently being made of conventional search radar equipment as well as standard radiotelephone communication systems. Harbor surveillance radars provide a continuous over-all view of ship movement. Radiotelephone communication equipment, of course, provides for direct voice communication between the maneuvering vessels and the harbor traffic coordinator.

It is recognized, however, that conventional radar and voice communication systems by themselves leave much to be desired toward the attainment of efficient and reliable monitoring of the traffic situation in a crowded harbor. As one example, a problem is routinely encountered in communicating specific navigation instructions to a pre-selected vessel. In this case, it is desirable that the navigation message be selectively communicated to the chosen vessel to the exclusion of other ships within the harbor so as to minimize the possibility of confusion. It is also desirable that the harbor traffic coordinator be able to identify without ambiguity the origin of inquiries and other messages being received from a maneuvering vessel. Lastly, it is important that such selective communication be accomplished through the addition of a minimum number of circuit components auxiliary to pre-existing standard navigational and communication gear.

The principal object of the present invention is to provide radio means for selectively communicating between two separated stations.

Another object is to provide radio means whereby a calling station may alert a distant station pre-selected on the basis of the location of the called station.

An additional object is to provide radio means whereby a calling station may identify the origin of the acknowledgment returned by the station which is alerted by the calling station.

A further object is to provide radio means for determining the identity of a remote responding station by correlation of a simultaneously received communication message and an automatic acknowledgment signal indicating the origin of the response.

A further object is to provide apparatus for cooperating with search radar and radio communication equipments located at each of a plurality of separate stations to establish a position-selective communication and identification link between any two station, each station being capable of calling or being called selectively.

Still another object of this invention is to provide means responsive to a narrow-band reply signal for accurately locating the origin of the reply.

These and other objects of the present invention, as will appear from a reading of the following specification, are accomplished by the provision of auxiliary apparatus which intermittently cooperates with conventional search radar and radio communication equipment to establish a selective communication link between two stations. Similar radar and radio apparatus is provided at both stations. The intermittent operation of the auxiliary equipment modifies only minimally the normal radio services and expedites the establishment of contact, thereby reducing radio channel loading and interference. The normal continuous use of the search radar apparatus is uninterrupted at both stations.

At the calling station, pulse repetition rate triggers are derived from a continuously scanning search radar. The triggers actuate the auxiliary apparatus to produce a sinusoidal waveform having crossover points which occur concurrently with the triggers. As the search radar of the calling station scans through the azimuth of the station selected to be called, the sinusoidal waveform is utilized to moduate the carrier of the calling station radio transmitter. The sinusoidally modulated radio carrier is transmitted by the calling station and received at the called station along with pulses from the calling station's radar only when the search radar antenna of the calling station points in the direction of the called station. The received radio carrier is demodulated and processed to produce pulses synchronized with the crossover points of the carrier modulating signal. Upon the concurrence of the received radar pulses and the crossover derived pulses, an alarm circuit is actuated at the called station.

When the called station answers, the auxiliary apparatus at that location makes possible the indentification of the source of the answer, by providing a specially modulated answering signal at the appropriate time. The returned radio answering signals, together with the normal radar echo of the called station, are utilized at the calling station to verify the origin of the radio acknowledgment. The auxiliary apparatus may be operated in either a calling or responding (acknowledging) mode. Thus, either station may call the other and either station may receive and respond to the call of the other.

For a more complete understanding of the present invention, reference should be had to the following specification and to the drawing which is a simplified block diagram of a preferred embodiment. As will be seen more fully later, substantially identical apparatus is utilized both at the calling station and at the called or responding station. Each apparatus is capable of operating in each of two modes, i.e. calling and responding, so that either station may call the other when desired.

The calling station includes a conventional search radar 1 having a continuously scanning directional antenna 2. Shaft 3, which drives antenna 2 in azimuth, is mechanically coupled by connection 4 to pulse generator 5. Generator 5 may comprise a simple cam actuated switching circuit which produces an output pulse of predetermined duration once per scanning cycle of antenna 2. The time at which the output pulse is produced may be adjusted relative to the time that scanning antenna 2 faces a reference direction by the setting of azimuth selector knob 6.

The pulsed output of generator 5 is coupled through contact C of manually actuated call-respond switch 7 to the control input terminal of switching circuit 10. Circuit 10 is an electrically operated double throw switch which selectively couples one of its two inputs to its output in response to the pulses produced by generator 5. In the absence of such pulses, the output of voice modulator 11 is coupled to radio transmitter 12; in the presence of pulses, the output of amplifier 9 is coupled to transmitter 12. In either case, the output of circuit 10 modulates the signal carrier generated within transmitter 12 and radiated by omnidirectional antenna 13.

The origin of the signals which drive amplifier 9 is determined by the setting of call-respond switch 8 ganged with switches 7 and 32 by member 53. In the call position shown for switch 8, the pulse repetition rate triggers of line 15 at the output of search radar 1 are applied to monostable multivibrator 16. Multivibrator 16 produces output pulses of predetermined duration having leading edges coincident with the trigger pulses of line 15. The duration of said output pulses is determined in a manner to be described later. The output pulses are differentiated and clipped in circuits 17 and 18, respectively, to produce output pulses on line 19 occurring concurrently with the trailing edges of the output pulses of multivibrator 16.

The pulses on line 19 trigger bistable multivibrator 20 to produce an output square wave having a recurrence frequency equal to one-half that of the input pulses of line 15. The square wave output signal is applied to band-pass filter 21 which extracts the fundamental component as a substantially pure sine wave. The sine wave is amplified in amplifier 9 and applied to switching circuit 10.

It will be recognized that certain signal delays are encountered in circuits 17, 18, 20, 21, 9, 10 and 12. Although the occurrences of the crossover points of the sine wave output of filter 21 occur at the same repetition rate as the pulse repetition rate triggers on line 15, the aforementioned delays must be taken into account to establish a desired phase relationship between the crossovers and the triggers. The duration of the pulse produced by monostable multivibrator 16 is designed in accordance with said delays so that the points on the modulated signal radiated from antenna 13 corresponding to the sine wave crossovers are in phase with the search radar pulses radiated from antenna 2.

The radar pulses radiated from antenna 2 are received at the receiving station by omnidirectional microwave antenna 22 and detected in microwave receiver 23. The detected microwave pulses are applied to a first input of AND circuit 24. The second signal input to AND circuit 24 is derived from the radio signal radiated from antenna 13. Said radio signals are received by omnidirectional antenna 25, and are amplified and demodulated in radio receiver 26. The resulting sinusoidal audio signal is processed in a conventional crossover detector 27 which produces output pulses concurrent with the crossover points of the audio signal. A suitable crossover detector is shown in FIG. 6 of copending patent application S.N. 569,917, filed on March 6, 1956 in the names of Walter C. Lanning and Robert E. Spero. The output crossover pulses are shaped and amplified in pulse generator 28. The shaped pulses are applied to the second input of AND circuit 24.

AND circuit 24 produces output pulses upon the simultaneous occurrences of the two input signals. The output pulse from circuit 24 is amplified in amplifier 29 and integrated in integrator 30. Integrator 30 produces an output control signal having an amplitude related to the direct component of the output pulses from amplifier 29. The control signal is applied to and actuates alarm circuit 31. The actuation of circuit 31 signifies that the receiving station is being selectively called.

When ganged switches 33 and 55 are in the respond (R) position, the output of pulse generator 28 or the output of activating signal source 56 causes AND circuit 24 to pass signals from microwave receiver 23, applying them through switch 33 to frequency divider 34. Frequency divider 34 includes circuits corresponding to 16, 17, 18, 20, 21 and 9 of the calling station. Accordingly, divider 34 produces an output sinusoidal signal having zero crossover points occurring in fixed phase relationship with the radar pulses received by omnidirectional microwave antenna 22. The sinusoidal output signal of divider 34 is applied to a first input of switching circuit 35.

The second input to circuit 35 is derived from the voice modulator 36. Circuit 35 is similar to switching circuit 10 of the calling station and is actuated in response to output pulses of generator 54 when call-respond switch 37 is in the respond position shown. The manually movable members of call-respond switches 33, 37 and 55 are ganged together by member 40. Generator 54 is a circuit such as, for example, a Schmitt trigger circuit, which produces one of two discrete output voltages in response to the presence of an input control signal. The control signal is applied via lead 60 connected from the output of integrator 30. One of the discrete output voltages actuates switching circuit 35 to connect divider 34 to transmitter 38; the other discrete output voltage actuates circuit 35 to connect voice modulator 36 to transmitter 38.

When the control signal amplitude is sufficient to energize pulse generator 54, circuit 35 acts to connect divider 34 to transmitter 38 whereby the sinusoidal output signal of divider 34 is available to modulate the carrier generated within transmitter 38 and radiated via antenna 39. It will be seen that sinusoidal modulation is imparted to said carrier only during the time that pulse generator 54 is actuated, which corresponds to the relatively brief interval that the scanning radar antenna 2 of the calling station is directed along the azimuth of the responding station. At all other times, alarm circuit 31 is not energized and the voice modulator 36 is connected to transmitter 38. Thus, the acknowledging response becomes a part of the regular answering communication of the responding station, making positive identification practical. The acknowledging sinusoidal modulation from frequency divider 34 is substituted for voice modulation for such a short period that it produces no appreciable reduction in intelligibility, being simply a "beep" as the calling station's radar antenna scans the responding station. As soon as the radar antenna of the calling station has scanned beyond the azimuth of the responding station, pulses ceases to appear at the output of AND circuit 24 and the integrated voltage output of integrator 30 falls beneath the triggering threshold of generator 34 to cause circuit 35 to restore the connection of voice modulator 36 to transmitter 38.

The sinusoidally modulated acknowledging signal transmitted by antenna 39 is received at the calling station by omnidirectional antenna 41. The acknowledging signal is demodulated in its passage through radio receiver 42, and activates crossover detector 43 and pulse generator 44 which correspond both in structure and function to elements 26, 27 and 28 described in connection with the responding station. The output pulse produced by generator 44 is applied to AND circuit 45 and to the target indicator of search radar 1. Assuming, for example, that a P.P.I. display is employed, the output pulses of generator 44, occurring once per repetition interval of search radar 1, are applied through switch 32 to intensify the cathode ray beam.

In this connection, it is convenient to consider that the pulsed acknowledging signal received by antenna 41 of the calling station is a radio "echo" signal from the responding station. Said pulsed signal contains the same range information as the normal radar echo signal reflected by the responding station and displayed on the target indicator of search radar 1. From this point of view, it can be said that the radar and radio echo signals from the responding station are superimposed on the calling station target display whereby the indication representing the responding station is intensified relative to other displayed radar echo signals. In this manner, the operator-observer at the calling station may verify the origin of the responding transmission to confirm that the desired position-selective communication link has been established, and may immediately correlate the stated identity of the responding station with the position of the responding station. The calling station operator may then proceed with normal communications with the selected station, confident that the information will be used by the intended recipient. It should be noted that the selective communication link is established, in accordance with the present invention, without requiring that the responding station be aware of its position relative to the calling station or that the calling station know the identity, e.g., the name or call sign of the position-selected vessel to be called. The calling operator need only select the location of the called vessel on the target indication of search radar 1 and then set azimuth selector control knob 6 in accordance therewith. A selective communication link is then automtically established with a minimum of apparatus auxiliary to pre-existing search radar and communication equipment. Moreover, the normal services of the radar and radio equipment are substantially enhanced in the process of establishing the selective communication link.

In order that either one of the stations may call or respond to the call of the other, apparatus additional to that already described is provided at both the calling and responding stations. The additional apparatus at the calling station comprises pulse generator 46, omnidirectional microwave antenna 47, microwave receiver 48, AND gate 45, amplifier 49, integrator 50, alarm circuit 51, and activating signal source 57. The additional apparatus of the responding station comprises search radar 52, pulse generator 53, and activating signal source 56. The signals provided by sources 56 and 57 are utilized only in the event that simultaneous radio communication transmission and reception is impractical at the responding station. In such a case, the actuating signal is applied to the respective one of AND gates 24 and 45 in the respond mode so that a radio response may be transmitted although only the microwave signal from the calling station is being detected. As a result of the additional apparatus, substantially identical equipment is made available at both stations whereby either may operate in the calling or responding mode by simple manipulation of the call-respond switch. The apparatus actually utilized at any given time in a typical call-respond situation is distinguished in the drawing by the heavy-shaded lines.

While the invention has been described in its preferred embodiments, it is understood that the words which have been used are words of description rather than the limitation and that changes within the purview of the appended claims may be made without departing from the true scope and spirit of the invention in its broader aspects.

What is claimed is:

1. A position-selective calling and identification system including two separated stations and providing for the selective alerting of one of said stations by transmissions from the other of said stations, said other of said stations compirsing a search radar having a continuously scanning directional antenna for radiating microwave pulses at a predetermined repetition rate, means connected to said antenna for producing a control pulse once each scanning cycle when said antenna scans through a predetermined direction, means connected to said radar for generating a modulating signal having a frequency related to said repetition rate of said microwave pulses, transmitting means for the radiation of a modulated carrier signal, and switching means actuated by said control pulse for selectively applying when actuated said modulating signal to said transmitting means to modulate said carrier signal; said one of said stations comprising means for receiving said microwave pulses, means for receiving said modulated carrier signal, and means connected to both said receiving means for comparing the occurrences of the received microwave pulses and predetermined points on the envelope of the received modulated carrier signal to produce an alarm signal upon the concurrence thereof.

2. A communication system providing position-selective calling and identification, including two separated stations and providing for the selective alerting of one of said stations by transmission from the other of said stations, said other of said stations comprising a search radar having a continuously scanning directional antenna for radiating microwave pulses at a predetermined repetition rate, means connected to said antenna for producing a control pulse once each scanning cycle when said antenna scans through a predetermined direction, means connected to said radar for generating a substantially sinusoidal modulating signal having a frequency related to said repetition rate of the radiated microwave pulses, transmitting means for the radiation of a modulated carrier signal, and switching means actuated by said control pulse for selectively applying when actuated said sinusoidal modulating signal to said transmitting means to modulate said carrier signal, said sinusoidal modulating signal having zero crossover points occurring in fixed phase relationship with said radiated microwave pulses whereby the points of the radiated carrier signal corresponding to said crossover points simultaneously occur with said radiated microwave pulses; said one of said stations comprising means for receiving said radiated microwave pulses, means for receiving said radiated carrier signal, means connected to said last-named receiving means for demodulating and processing the received carrier signal to produce reference pulses simultaneously with said points of said modulated carrier signal corresponding to said crossover points of said modulating signal, and means connected to both said means for receiving said microwave pulses and to said means for demodulating said received carrier signal to produce an alarm signal upon the concurrence of said microwave pulses and said reference pulses.

3. A selective call system including two separated stations and providing for the position-selective alerting and identification of one of said stations by transmissions from the other of said stations, said other of said stations comprising a first radar having a continuously scanning directional antenna for radiating microwave pulses at a predetermined repetition rate, means connected to said antenna for producing a control pulse once each scanning cycle when said antenna scans through a predetermined direction, means connected to said radar for generating a modulating signal having a frequency related to said repetition rate of said microwave pulses, transmitting means for the radiation of a modulated carrier signal, and switching means actuated by said control pulse for selectively applying when actuated said modulating signal to said transmitting means to modulate said carrier signal; said one of said stations comprising means for receiving said microwave pulses, means for receiving said modulated carrier signal, means connected to both said receiving means for comparing the occurrences of the received microwave pulses and predetermined points on the envelope of the received modulated carrier signal to produce alarm pulses upon the concurrence thereof, means connected to said comparing means for integrating said alarm pulses, and utilization means connected to said integrating means and actuated by said integrated alarm pulses.

4. A two station communication system wherein one of said stations may selectively alert the other of said stations and identify the origin of an acknowledging signal returned by said other station, said one of said stations comprising a search radar having a continuously scanning directional antenna for radiating and receiving microwave pulses at a predetermined repetition rate, said radar including target data display means, means connected to said antenna for producing a control pulse at a selectable time once each scanning cycle of said antenna, means connected to said radar for generating a first modulating signal having a frequency related to said repetition rate of said microwave pulses, first transmitting means for the radiation of a first modulated carrier signal, and switching means actuated by said control pulse for selectively applying when actuated said first modulating signal to said first transmitting means to modulate said first carrier signal; said other of said stations comprising means for receiving said microwave pulses, means for receiving said first modulated carrier signal, means connected to both said receiving means for comparing the occurrences of the received microwave pulses and predetermined points on the envelope of the received first modulated carrier signal to produce alarm pulses upon the concurrence thereof, the frequency of said alarm pulses being equal to the repetiton rate of said microwave pulses, means connected to said comparing means for generating a second modulating signal having a frequency related to the repetition rate of said alarm pulses, second transmitting means for the radiation of a second modulated carrier signal, second switching means actuated by said alarm pulses for selectively applying when actuated said second modulating signal to said second transmitting means to modulate said second carrier signal; said one of said stations further comprising means for receiving and demodulating said second modulated carrier signal, and means for applying signals derived from the demodulated second carrier signal to said target data display means.

5. Means for establishing a selective communication link between two separated stations and providing for station identification in terms of station location, one of said stations comprising a search radar having a continuously scanning directional antenna for radiating and receiving microwave pulses at a predetermined repetition rate, radar target display means, means connected to said antenna for producing a control pulse at a selectable time once each scanning cycle of said antenna, means connected to said radar for generating a first modulating signal having a frequency related to said repetition rate of said microwave pulses, means for producing a second modulating signal, first transmitting means for the radiation of a first modulated carrier signal, and switching means actuated by said control pulse for selectively applying said first and second modulating signals to said first transmitting means to modulate said first carrier signal, said switching means applying said first modulating signal in the presence of said control pulse and applying said second modulating signal in the absence of said control pulse; the other of said stations comprising means for receiving said microwave pulses, means for receiving said first modulated carrier signal, means connected to both said receiving means for comparing the occurrences of the received microwave pulses and predetermined points on the envelope of the received first modulated carrier signal to produce alarm pulses upon the concurrence thereof, the frequency of said alarm pulses being equal to the repetition rate of said microwave pulses, means connected to said comparing means for generating a third modulating signal having a frequency related to the repetition rate of said alarm pulses, means for producing a fourth modulating signal, second transmitting means for the radiation of a second modulated carrier signal, second switching means actuated by said alarm pulses for selectively applying said third and fourth modulating signals to said second transmitting means to modulate said second carrier signal, said switching means applying said third modulating signal in the presence of said alarm pulses and applying said fourth modulating signal in the absence of said alarm pulses; said one of said stations further comprising means for receiving and demodulating said second modulated carrier signal, and means for applying signals derived from the demodulated second carrier signal to said target data display means.

6. Auxiliary apparatus for cooperating with search radar and radio carrier signal transmitting and receiving means located at each of two separated stations to establish a selective communication link between said two stations and to identify said stations in terms of their location, each said radar including target data display means and a scanning directional antenna for radiating microwave pulses toward and for receiving microwave pulses from the other of said stations, each said radar producing output triggers synchronous with the radar repetition rate, each said radio carrier signal transmitting means radiating a first modulated radio carrier signal to the radio receiving means located at the other of said stations, each said radio carrier signal receiving means receiving a second modulated radio carrier signal transmitted from the other of said stations, said auxiliary apparatus at each station comprising means connected to said directional antenna for producing a control pulse when said antenna scans through a predetermined direction, means responsive to repetitive input pulses for producing a modulated signal having a predetermined time relationship to the time of occurrence of said repetitive input pulses, first switching means actuated by a control signal for selectively applying when actuated said modulating signal to said radio transmitting means to produce said first modulated radio carrier signal, means including an omnidirectional antenna for receiving and demodulating the microwave pulse transmitted from said other of said stations, means connected to the last-named means and to said radio carrier signal receiving means for comparing the occurrences of the received microwave pulses and predetermined points on the envelope of the received second modulated radio carrier signal to produce alarm pulses upon the concurrence thereof, the frequency of said alarm pulses being equal to the repetition rate of said microwave pulses, first means for selectively applying said alarm pulses and said output triggers as said repetitive input pulses to said means for generating said modulating signal, second means synchronously operative with said first means for selectively applying said control pulse and said alarm pulses as said control signal to said first switching means for the actuation thereof, means connected to said comparing means and responsive to said alarm pulses for signaling the presence of said alarm pulses, and means for applying said received second modulated radio carrier signal to said target display means.

7. A position-selective calling and identification system including two separated stations and providing for the selective alerting of one of said stations by transmissions from the other of said stations, said other of said stations comprising a search radar having a continuously scanning directional antenna for radiating microwave pulses at a predetermined repetition rate, means connected to said antenna for producing a control pulse once each scanning cycle when said antenna scans through a predetermined direction, means connected to said radar for generating a modulating signal having a frequency related to said repetition rate of said microwave pulses, transmitting means for the radiation of a modulated carrier signal, and switching means actuated by said control pulse for selectively applying when actuated said modulating signal to said transmitting means to modulate said carrier signal; said one of said stations comprising means for receiving said microwave pulses, means for receiving said modulated carrier signal, means connected to both said receiving means for comparing the occurrences of the received microwave pulses and predetermined points on the envelope of the received modulated carrier signal to produce an alarm signal upon the concurrence thereof, and means connected to said comparing means for selectively modifying the operation thereof whereby said alarm signal is produced upon the occurrence of said received microwave pulses alone.

8. A selective call system including two separated stations and providing for the position-selective alerting and identification of one of said stations by transmission from the other of said stations, said other of said stations comprising a first radar having a continuously scanning directional antenna for radiating microwave pulses at a predetermined repetition rate, means connected to said antenna for producing a control pulse once each scanning cycle when said antenna scans through a predetermined direction, means connected to said radar for generating a modulating signal having a frequency related to said repetition rate of said microwave pulses.

transmitting means for the radiation of a modulated carrier signal, and switching means actuated by said control pulse for selectively applying when actuated said modulating signal to said transmitting means to modulate said carrier signal; said one of said stations comprising means for receiving said microwave pulses, means for receiving said modulated carrier signal, means connected to both said receiving means for comparing the occurrences of the received microwave pulses and predetermined points on the envelope of the received modulated carrier signal to produce alarm pulses upon the concurrence thereof, means connected to said comparing means for selectively modifying the operation thereof whereby said alarm pulses are produced upon the occurrence of said received microwave pulses alone, means for integrating said alarm pulses, and utilization means connected to said integrating means and actuated by the integrated alarm pulses.

References Cited in the file of this patent

UNITED STATES PATENTS 2,831,185 Goldbohm et al. ________ Apr. 15, 1958